F. H. SUMMERIL.
POWER TRANSMISSION MECHANISM.
APPLICATION FILED NOV. 19, 1910.
1,145,819.
Patented July 6, 1915.
4 SHEETS—SHEET 1.
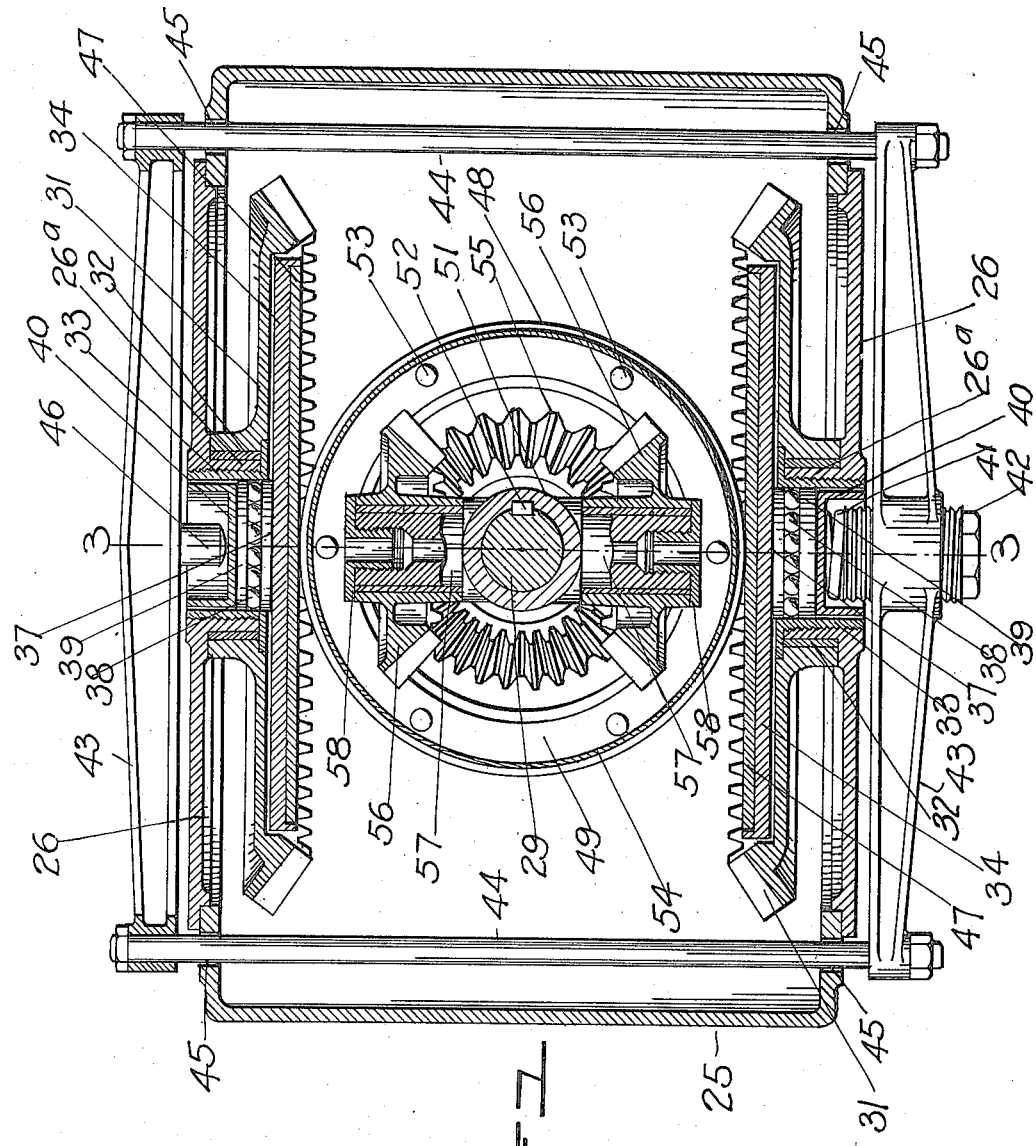
WITNESSES:
F. H. Cuno.
Em Krempel.
INVENTOR.
F. H. Summeril.
BY
ATTORNEY

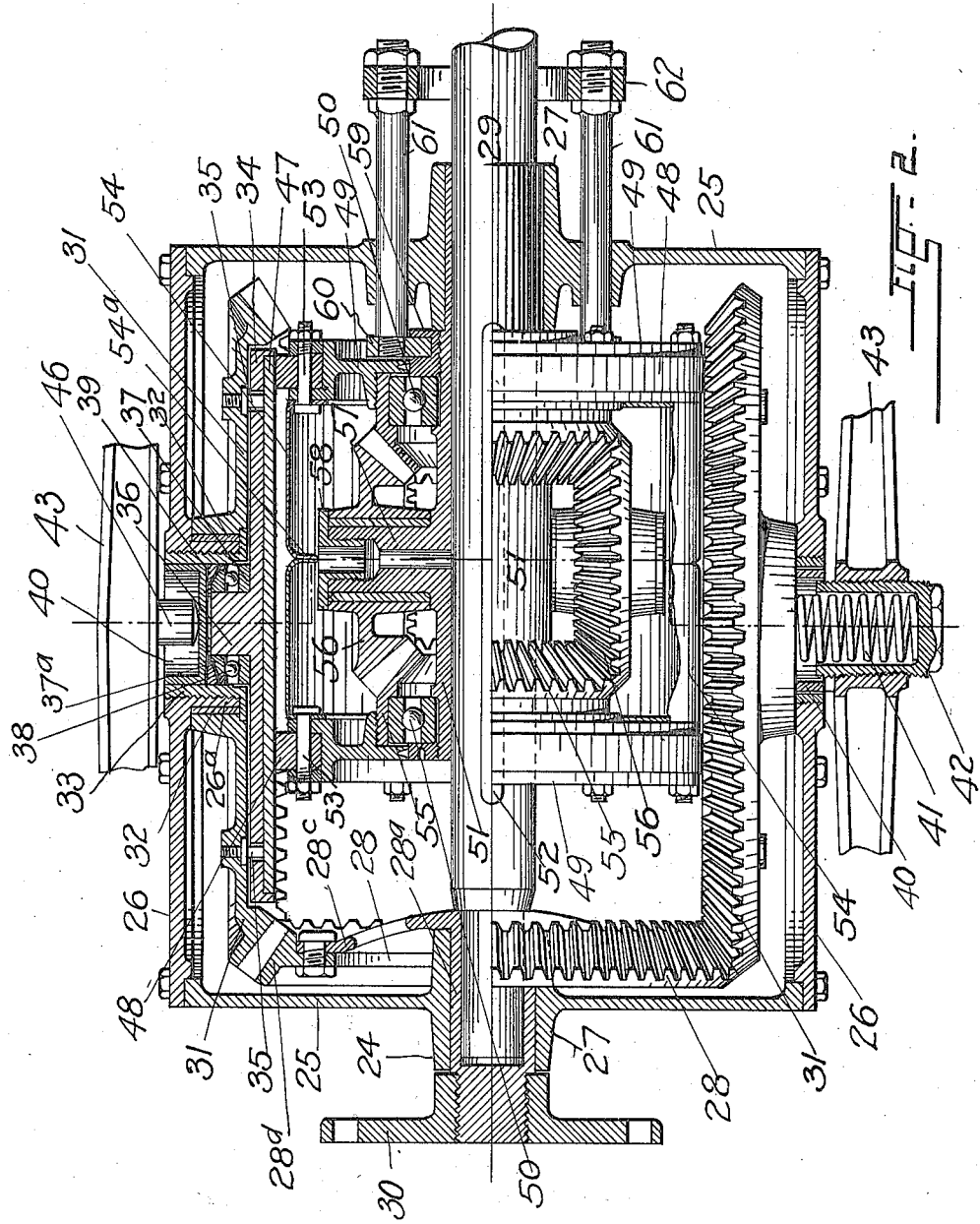

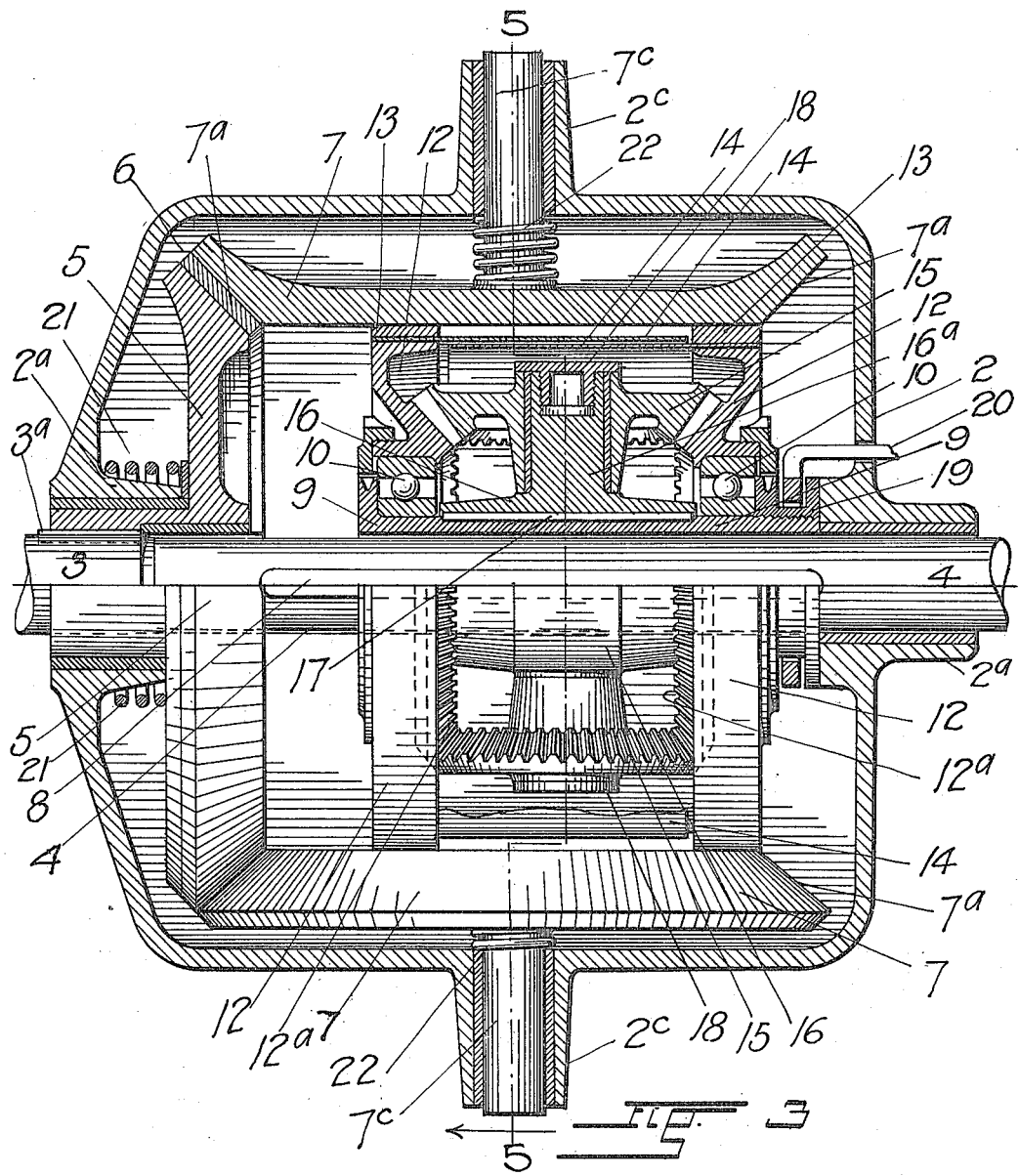

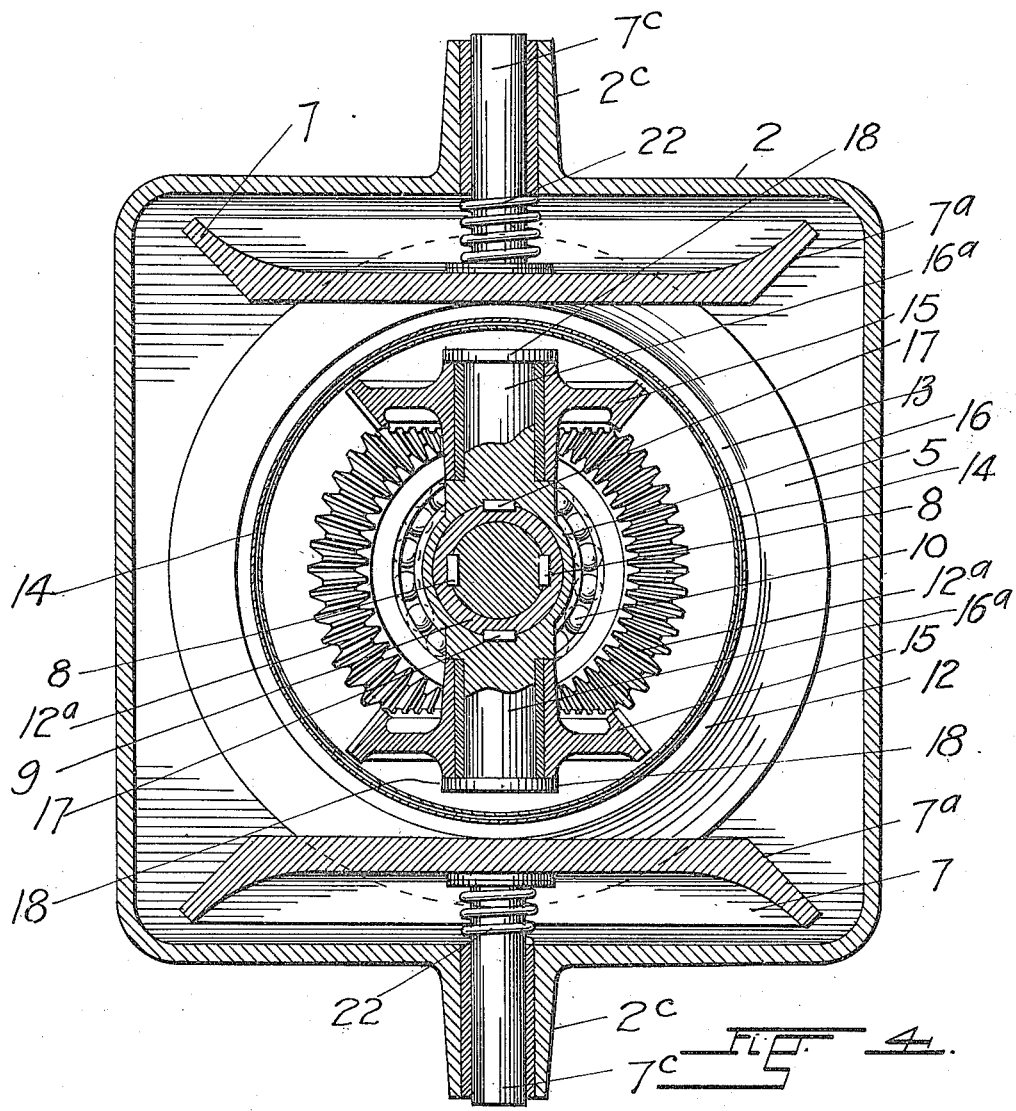

UNITED STATES PATENT OFFICE.

FRANK H. SUMMERIL, OF DENVER, COLORADO.

POWER-TRANSMISSION MECHANISM.

1,145,819.  Specification of Letters Patent.  Patented July 6, 1915.

Application filed November 19, 1910. Serial No. 593,227.

*To all whom it may concern:*

Be it known that I, FRANK H. SUMMERIL, a citizen of the United States of America, residing at Denver, in the county of Denver and State of Colorado, have invented certain new and useful Improvements in Power-Transmission Mechanism, of which the following is a specification.

My invention relates to new and useful improvements in power transmission mechanisms and more particularly in the mechanical contrivances designed to transmit the rotatory movement of a driving element, such as a motor shaft, to a driven element at a variable rate of speed.

The principal object of the invention resides in the provision of a compact mechanism of simple construction and great practicability in use, by means of which the ratio between the velocities of the driving and driven elements may be varied to a very small degree, which by means of a single adjustment, may be adapted to effect a rotatory movement of the driven element in opposite directions, at different rates of speed, or to discontinue the said movement while the driving element remains in motion, and in which wear and loss of energy are reduced to a minimum by elimination of excessive friction between its parts. I attain these objects by the provision of a pair of axially alined, independently rotating wheels, the peripheral surfaces of which are in frictional contact with the plane faces of rotatory disks which are driven in opposite directions by connection with the driving element. The independently rotating wheels engage the friction disks at opposite sides of their axis of rotation, and a simple adjustment is provided to move the said wheels in unison, along the line determined by their points of contact. Gears connected with the friction-wheels serve to transmit their rotatory movement to one or more interposed gears which are mounted to have a planetary motion about the axis of rotation of the said wheels and whose movement is, through the instrumentality of a simple transmission mechanism, converted into a rotatory movement of the driven element, which in the construction hereinafter to be described, consists of a shaft disposed in axial alinement with the driving element.

While the arrangement and construction of the various parts comprised in my improved transmission mechanism may be varied in different ways, without departing from the principle of the invention, I prefer, by reason of its simplicity and compactness, the construction shown in the accompanying drawings in the various views of which like parts are similarly designated and in which—

Figure 1 is a sectional elevation of the transmission mechanism the casing in which it is inclosed having been shown in section, Fig. 2, a section taken along the line 3—3, Fig. 1, Fig. 3, a composite sectional view and elevation of a modified form of the invention and Fig. 4, a section taken along the line 5—5, Fig. 3, looking in the direction of the arrow.

Referring to the drawings by numerical reference characters, 25 designates a casing rectangular in cross section, in which the transmission mechanism is inclosed, and whose open ends are closed by means of plates 26. The casing is provided, at opposite sides, with axially alined bearing sleeves 27, for the support of a driving gear 28, and a driven shaft 29. The gear 28 is composed of an axially recessed hub $28^a$ which by means of integral spokes $28^c$ is connected with a concentric, beveled toothed rim $28^d$, and the outer extremity of which, protruding beyond the sleeve 27, is threaded for the application of a flanged union 30 by means of which it is, in practice, rigidly secured to the fly-wheel or other rotating part of a motor or other driving element. The driven shaft 29 which is mounted in the bearing 27 opposite to that which carries the gear 28, is reduced in diameter at its inner extremity, to fit the recess of the hub $28^a$, in which it is rotatably supported. The end plates 26 of the casing 25 are constructed with central, inwardly projecting hollow bosses $26^a$ upon which two gear wheels 31, which mesh with the driving gear 28, are rotatably mounted. Babbitt linings 32 are applied between the hubs of the gears 31 and the respective bosses, for the usual purpose; and hollow, flanged nuts 33 are screwed into the threaded interiors of the said bosses, to maintain the gears against displacement in the direction of their alined axes. Circular recesses formed concentrically in the inner faces of the gear wheels 31, are provided to receive friction-disks 34 which are connected with the said wheels by means of a plurality of studs 35 which project from faces of the recesses in the wheels, into corresponding openings in the respective disks. Short, cylindrical studs 36 formed centrally on the disks 34, extend through thrust bearings which are fitted within the nuts 33, and the members 37 and 37$^a$ of which, bear against anti-friction balls 38. The outermost members 37$^a$ of the bearings, are beveled to engage corresponding faces on rings 39 which bear against the bottom surfaces of cups 40 which are slidably fitted in the respective nuts 33.

A coiled spring 41 which extends into the cup 40 at one end of the casing 25, is carried in a hollow adjusting nut 42 which is screwed into a correspondingly threaded opening in one of a pair of parallel yoke-members 43 which extending alongside the outer surfaces of the plates 26, are connected at their extremities by rods 44 which are slidably fitted in alined openings 45 in the end portions of the casing 25. The cup opposite to that engaged by the spring 41, is in contact with the end of a short stud 46 on the corresponding yoke-member 43, which serves to transmit the reactive force of the spring to the adjacent friction disk 34.

It will thus be seen that by the above means the one spring applied at one end of the casing, serves to maintain the two disks 34, in frictional contact with the interposed members of the transmission mechanism hereinafter to be described, that by rotation of the nut 42, the position of the said disks may be adjusted to compensate for wear of the contacting surfaces, and that the bearings composed of the parts 37 and 37$^a$ and the balls 38, while receiving the axial thrust of the disks, permit a limited gyratory motion of the same, in case the contact of the two members of the transmission mechanism, which engage their faces at opposite sides of the centers thereof, is uneven.

The working faces of the friction disks 34, which are provided by circular plates 47 of aluminum or other friction inducing material, disposed in recesses in their outer surfaces, are frictionally engaged at opposite sides of the alined axes of rotation of the disks, by the circumferential surfaces of the tires 48 of two wheels 49 which, through the instrumentality of ball bearings 50, are independently rotatably carried upon the ends of a sleeve 51 which, by the use of feathers 52, is longitudinally slidably mounted upon the driven shaft 29.

The tires 48 which, like the plates 47, are composed of a suitable friction inducing substance, are attached to the recessed rims of the respective wheels 49, by means of bolts 53, which furthermore serve to secure a cylindrical shell 54, which incloses the planet gearing hereinafter to be described, and which being disposed between the two friction wheels 49, in concentric relation thereto, is composed of two halves, the abutting edges of which are formed with inturned flanges 54$^a$.

The object of the shell 54 is to exclude dirt and dust from the inclosed gearing and to provide a receptacle for the material by which the bearings and other contracting surfaces, are lubricated.

Detachably connected with the wheels 49, are beveled gears 55, which, being disposed opposite to each other, in concentric relation to the sleeve 51, are in operative engagement with two similar gear-wheels 56 which are rotatably mounted upon diametrically opposite mandrels 57 formed integral with the said sleeve. Nuts 58 screwed into threaded bores in the extremities of the mandrels, are applied to maintain the gears 56 against movement in the direction of their axes.

The sleeve 51 carries upon one of its extremities, a circumferentially grooved collar 59, whose groove is occupied by a ring 60 which by means of two or more double-ended bolts 61, slidably projecting through openings in the adjacent side of the casing 25, is connected with a second ring 62 which encircles the portion of the driven shaft 29, extending exteriorly of the casing. The last mentioned ring may be connected with a lever or other suitable device adapted to move it in the direction of the axis of the shaft.

Having thus described the mechanical construction of my improved transmission mechanism in its preferred form, its operation will be readily understood. When, during the rotary movement of the driving gear 28, the distances between the points of contact of the wheels 49 with the working faces of the disks 34 and the axes of rotation of the latter, are equal, the said wheels, revolving in opposite directions at equal rates of speed, will impart to the gear wheels 56, a rotatory motion about their own axes, without affecting their position with relation to the driven shaft 29 which, in consequence, remains at rest. If, however, the distances above referred to are made dissimilar by movement of the sleeve 51 along the shaft 29, the wheels 49, rotating at proportionately different rates of speed, will act upon opposite sides of the planet gears 56 with unequal forces with the result that the latter will not only turn about their own axes, but will simultaneously be moved about the axis of the driven shaft, with a velocity equal to one half the difference between the velocities of the two wheels 49. This planetary motion of the gears 56, is by means of the feather 52, transmitted to the shaft 29, which, in consequence, will rotate in its bearings, and inasmuch as the velocity of the latter depends on the torque which causes said planetary movement, it will readily be seen that by varying the distances between the centers of the working faces of the disks 34, and their points of contact with the wheels 49, the said velocity may be increased or decreased to any desired degree within the limits prescribed by the diameter of the friction disks, in accordance with the rate of speed of the driving gear 28.

To reverse the direction of rotation of the shaft 29, it is but necessary to reverse the position of the wheels 49 with relation to the axis of rotation of the disks 34, and to discontinue the movement of the same, the sleeve 51 is moved until the distances between the said axis and the points of contact of the friction wheels, are again equal.

While the construction as shown and described is preferred by reason of its strength and the balanced distribution of forces, the operation of the mechanism will remain the same, if one of the gears 56 or one of the gear wheels 31 and the therewith associated friction disk, are omitted and it will be observed that under all conditions, even while the shaft 29 is at rest, a rolling contact is maintained between the frictionally engaging members 34 and 49, and that a grinding action such as takes place in single disk friction drives, in which the mechanism is placed in the dead condition by moving the driven member in contact with the center of the working face of the driving member, is entirely avoided.

In the modified form illustrated in Figs. 3 and 4, the casing 2 has in its opposite sides, axially alined bearings 2ᵃ for the support of the driving shaft 3 and the driven shaft 4. A beveled friction wheel 5 whose working face is covered with a rawhide tire 6, engages the corresponding faces 7ᵃ of axially alined wheels 7 the spindles 7ᶜ of which are rotatably mounted in bearings 2ᶜ on the casing 2. Longitudinally slidably mounted upon the driven shaft 4, by means of feathers 8, is a sleeve 9 which by means of ball-bearings 10, supports the friction disks 12 which engage the faces of the wheels 7 at opposite sides of the centers thereof. The disks 12 are surrounded by tires 13 of friction inducing material and they carry the inwardly projecting overlapping shells 14 which inclose the planet-gearing consisting of two beveled pinions 15, rotatably mounted upon mandrels 16ᵃ on a collar 16 which, by means of keys 17, is fixedly secured around the sleeve 9. The pinions 15 are in engagement with gears 12ᵃ formed integral with the disks 12 and caps 18 screwed into threaded bores in the ends of the mandrels 16ᵃ hold the pinions against displacement in the direction of their axes. The sleeve 19 carries at one of its ends the circumferentially grooved nut 19 which connects with the extremity of an operating rod 20 which, projects through an opening in the casing. Coiled springs 22 placed around the spindles 7ᶜ, between the wheels 7 and the respective adjacent inner surfaces of the casing 2, are provided to maintain the said wheels in frictional contact with the peripheral surfaces of the disks 12, and a third spring 21, whose expansive strength is less than the combined strengths of the two springs 22, is placed between the casing and the driving wheel 5, which as hereinbefore explained is slidably mounted upon the driving shaft 3. The coöperative actions of the three springs insures a continuous frictional contact between the beveled faces of the wheels 5 and 7, and between the plane faces of the latter and the peripheral surfaces of the disks 12.

Having thus described my invention what I claim and desire to secure by Letters-Patent is:—

1. A transmission mechanism comprising two axially alined wheels rotating in opposite directions, disks axially movably mounted thereon and having opposed friction surfaces, a pair of friction wheels engaging said surfaces at opposite sides of the centers thereof, means to move said friction wheels axially in unison, a planet gear operatively associated with said friction wheels, a driven element, means for transmitting the movement of the planet-gear thereto, a reciprocatory yoke, a spring between said yoke and one of said disks to resiliently oppose the axial thrust thereof, and a connection between said yoke and the opposite disk to transmit the reactive force of the said spring thereto.

2. A transmission mechanism comprising two axially alined wheels rotating in opposite directions, disks axially movably mounted thereon and having opposed friction surfaces, a pair of friction wheels engaging said surfaces at opposite sides of the centers thereof, means to move said wheels, axially in unison, a planet gear operatively associated with said friction wheels, a driven element, means for transmitting the movement of said planet-gear thereto, bearings slidably disposed to receive the axial thrust of the respective disks, a reciprocatory yoke, a spring between the said yoke and one of the said bearings, and a rigid connection between the said yoke and the other bearing.

3. A transmission mechanism comprising a rotary element having a friction surface, a driven shaft, a sleeve slidably mounted on said shaft to rotate in unison therewith, a pair of friction wheels, independently rotatably mounted on said sleeve, in engagement with the said surface, at opposite sides of its center, gears respectively connected with the wheels, and a planet wheel rotatable on said sleeve, in engagement with the said gears.

4. A transmission mechanism comprising a driving wheel having a friction surface, a shaft, a sleeve slidably mounted on said shaft to rotate in unison therewith and having laterally projecting mandrels, a pair of friction wheels independently rotatably mounted on said sleeve, in engagement with the said surface at opposite sides from its center, gears respectively connected with the said friction wheels, and planet wheels rotatably mounted on the said mandrels, in engagement with the said gears.

5. A transmission mechanism comprising two axially alined, rotary elements, disks axially movably mounted thereon and having opposed friction surfaces, a pair of friction wheels engaging said surfaces at opposite sides of the centers thereof, means to move said wheels axially in unison, a planet gear operatively associated with said friction wheels, a driven element, means for transmitting the movement of said planet gear to the driven element, a reciprocatory yoke, a nut adjustable thereon, a spring between said nut and one of the said disks to receive the axial thrust thereof, and a rigid connection between said yoke and the opposite disk.

In testimony whereof I affix my signature in presence of two witnesses.

FRANK H. SUMMERIL.

Witnesses:
G. J. ROLLANDET,
E. M. KREMPEL.

Copies of this patent may be obtained for five cents each, by addressing the "Commissioner of Patents, Washington, D. C."